United States Patent [19]

Simonton

[11] Patent Number: 4,505,996
[45] Date of Patent: Mar. 19, 1985

[54] PRIMARY FLAT CELL

[76] Inventor: Robert D. Simonton, 1900 Hampton Rd., Fremont, Ohio 43420

[21] Appl. No.: 539,827

[22] Filed: Oct. 7, 1983

[51] Int. Cl.³ .............................................. H01M 6/46
[52] U.S. Cl. ................................... 429/162; 429/154; 429/159
[58] Field of Search ............... 429/157, 158, 159, 154, 429/153, 122, 162, 139

[56] References Cited

U.S. PATENT DOCUMENTS

| | | | |
|---|---|---|---|
| 2,307,765 | 1/1943 | Deibel | 429/157 |
| 2,745,894 | 5/1956 | Nowotny | 429/154 |
| 2,830,110 | 4/1958 | Kirkman | 429/153 |
| 3,525,647 | 8/1970 | Strauss | 429/159 |
| 3,708,340 | 1/1973 | Tamminen | 429/157 |
| 4,060,670 | 11/1977 | Tamminen | 429/159 |
| 4,070,528 | 1/1978 | Bergum et al. | 429/152 |
| 4,374,186 | 2/1983 | McCartney et al. | 429/157 |

Primary Examiner—Donald L. Walton
Attorney, Agent, or Firm—David H. Wilson

[57] ABSTRACT

There is disclosed a primary cell for batteries having a sealed, flexible, non-conductive envelope for the active elements of a cell. A subassembly of a combination of the active elements comprises a pouch containing a fluid electrode mass and having a separator sheet included in one wall thereof adapted to be positioned in the envelope with the separator sheet between the enclosed electrode mass and the opposite polarity electrode. The electrode mass-separator subassembly is made up of sheets of flexible material positioned on opposite faces of the electrode mass and bonded together as by face-to-face fusion of the materials of the sheets around their superimposed perimeters to enclose the electrode mass.

10 Claims, 5 Drawing Figures

PRIMARY FLAT CELL

This invention relates to a primary flat cell for batteries and more particularly to the construction of an electrode-separator component of such a cell.

Heretofore it has been known to fabricate flat cells in pouch form wherein an outer cell envelope is an electrolyte impervious sheet of flexible material. In Nowotny U.S. Pat. No. 2,745,894 a cell is shown comprising outer sheets of a non-conductive plastic of chlorinated rubber film bonded together at their peripheries by an adhesive which is coated over at least the periphery of the inner face of each sheet to form a pouch enveloping all of the elements of a primary cell and containing the electrolyte of the cell. The cell elements comprise an electrode in the form of a metal sheet, separated from a cake of depolarizer mix by a suitable electrolyte carrier which may be a sheet of fibulous paper. A sheet of conductive plastic is positioned against the opposite face of the mix cake to serve as the other electrode of the cell and a metallic collector plate is positioned against the opposite face of the conductive plastic. Current flow communication is established from the exterior of the cell to its interior components by means of pointed conductive elements which puncture the non conductive plastic walls to engage the respective electrodes or their collector plates. The plastic sheet walls are self sealing in the region pierced by the cell connectors by means of an adhesive coating on the plastic.

An alkaline flat cell battery hermetically sealed within plastic sheets is disclosed in Tamminen U.S. Pat. No. 4,060,670. That cell has metal collector plates on its outer faces immediately underlying the plastic sheets. Connections to the elements within the sealed plastic envelopes are made with contact elements formed as metallic spring elements resiliently compressible in a direction perpendicular to the contact area of the cell when their end engages one of the metal collector plates. The contact elements have pointed ends which pierce a chemically inert water repellant adhesive on the metal plates which is compressed against and heat sealed to the plastic envelope sheets to form a seal against electrolyte leakage at the point of penetration of the envelope sheet.

In the Nowotny and Tamminen disclosures the electrolyte solution of the cells is carried in a sheet medium which absorbs and retains the solution. Nowotny's sheet is shown as a single layer sandwiched between stacked elements of the cell. Tamminen wraps each electrode and its associated metal sheet current collector in separator paper in which apertures are provided to expose the layer of adhesive on the metal plate within the wrapper to the plastic sheet envelope and cooperate therewith to provide the seal medium.

An object of the present invention is to simplify the construction of flat primary cells while enhancing their characteristics.

In accordance with these objects a feature of the invention is an electrode-separator packet which is pliant and accomodates itself to a flexible cell envelope without undue distortion of the element. Such a packet, wherein the electrode material in the form of a fluid mass is contained for convenient handling as a component of the cell in which it is to be incorporated, facilitates the assembly of cells in mass production.

Other objects and features of this invention will be more fully appreciated from the following detailed description when read with reference to the accompanying drawings wherein.

Figure 1:
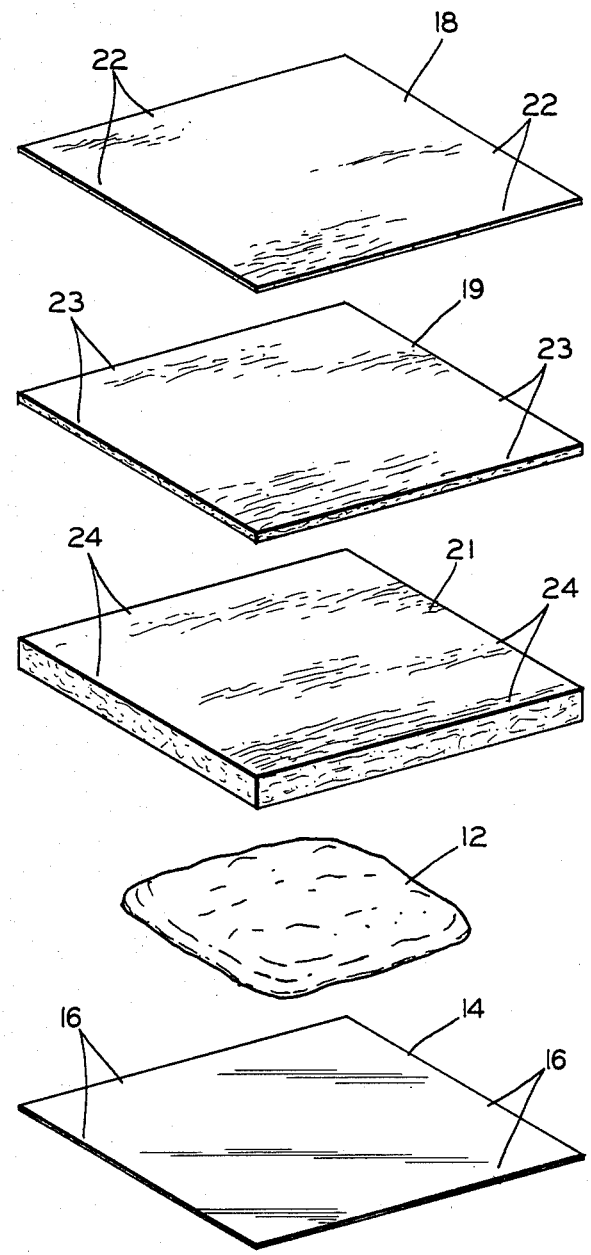
FIG. 1 is an exploded perspective view of the electrode-separator component of a cell according to this invention.
Figure 2:
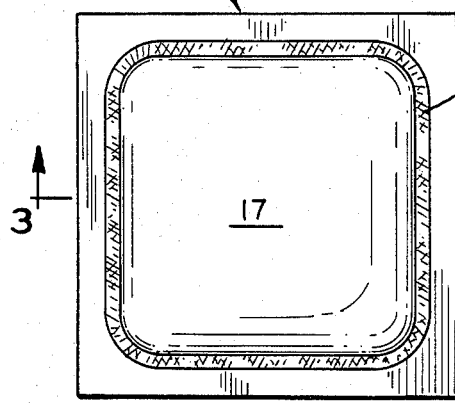
FIG. 2 is a plan view of the assembled electrode-separator component made up of the elements of FIG. 1.
Figure 3:
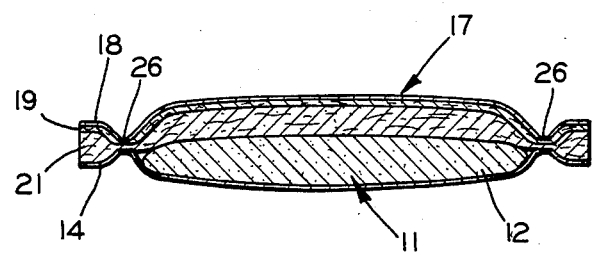
FIG. 3 is a sectioned elevational view of the electrode-separator component taken along line 3—3 of FIG. 2.
Figure 4:
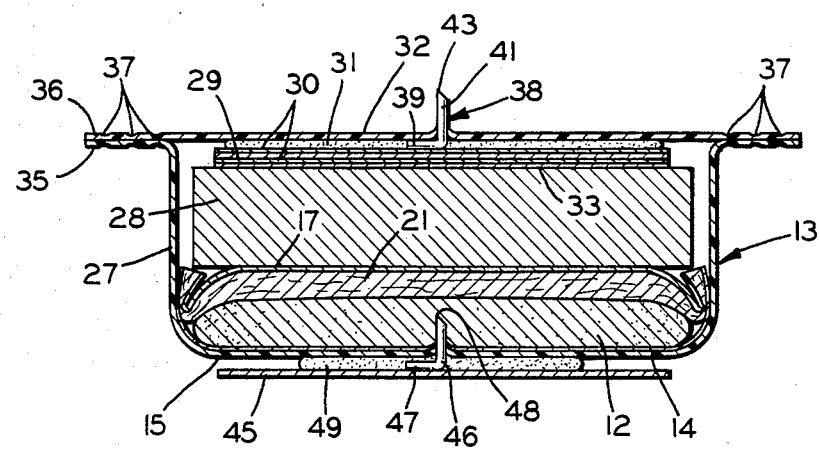
FIG. 4 is a sectioned elevational view of a cell incorporating the electrode-separator component of FIGS. 1-3.

FIGS. 1, 2 and 3 illustrate an electrode-separator component for a cell as shown in FIG. 4 wherein a pliant pouch 11 is made up of pliant superimposed sheets enclosing an electrode mass 12. The pouch 11 can be made up to contain the negative electrode of a cell as shown in FIG. 4 as a separate and readily handled component which, in assembly of the cell is placed in the bottom of a plastic sheet cup 13 forming a portion of the cell envelope. By virtue of the pliant nature of pouch 11, it conforms to and thus efficiently fills the lower portion of cup 13.

Pouch 11 is made up, as viewed in FIGS. 1, 2 and 3, of a bottom sheet 14 of sufficiently greater extent than the bottom surface 15 of cup 13 to provide a margin 16 around the negative electrode mass 12 suitable for face-to-face engagement with and sealing to an upper sheet 17 when it overlays the mass 12. The upper sheet is shown as a composite including one or more containment sheets 18 and 19 and an absorber sheet 21 respectively having bondable margins 22, 23 and 24 for sealing engagement with lower sheet margin 16. When sealed together and to margin 16, margins 22, 23 and 24 can be viewed as a unitary margin 26 for upper sheet 17.

An advantageous negative electrode-separator component constructed as described above comprises a bottom 14 of a three mil thick polyethylene sheet on which is deposited a negative electrode mass 12 as by means of an extruder. The mass 12 may be a gel mixture of 59.6% by weight of finely divided zinc powder, 3.5% by weight of mercury metal; 1.3% by weight of carboxymethylcellulose and 35.6% by weight of a 45% solution of potassium hydroxide. In order to provide an absorber and retainer for the potassium hydroxide electrolyte in the separator region between the negative and positive electrode of the cell an absorber sheet 21 is positioned adjacent mass 12 and formed of a felted blend of 80% rayon fibers and 30% polypropylene which may be a needle point felt having a basis weight of 5.0 ounces per square yard and an uncompressed thickness of 140 mils. The containment sheets 19 and 18 overlayed on absorber sheet 21 are pllypropylene felted fiber sheets of 28 mils and 6 mils respectively designated 2108 Pellon and 2121 Pelon each of which have an average pore size of 20 microns. Advantageously, two containment layers are employed so that the misalignment of their pores inhibit the migration of graphite to the negative mass when the cell is discharging.

The pouch is formed by laying down sheet layers 21, 19 and 18 on the negative electrode gel mixture on bottom sheet 14 and thermally or ultrasonically bonding the sheets at their margins 16, 24, 23 and 22. In the bonding operation the polypropylene of the composite upper sheet 17 and the polyethylene fuse into a continuous bonded joint 26 which is closed upon itself around the perimeter of the electrode mass 12. Bonding is effected through the rayon fibers of absorber sheet 21 by the flow of the thermally or ultrasonically melted and fused polypropylene and polyethylene.

The primary dry cell component or subassembly forming the electrode mass-separator comprises a flexible pouch 11 containing a fluid electrode mass 12. A first wall 17 of the pouch includes a flexible sheet 21 of separator material which is absorbant to and retains liquid electrolyte on one side of electrode mass 12. That wall 17 can be of a plurality of sheets 18, 19 and 21. A second wall 14 of pouch 11 includes a flexible sheet of material which contains the electrode mass on the face thereof opposite that contained by the first sheet 17. A face-to-face bond or joint 26 between the first wall 17 and the second wall 14 which can be thermally formed as by ultrasonic welding of the materials of the walls surrounds the fluid electrode mass to enclose it in a unitary structure which can be conveniently handled in the manufacture of cells.

As shown in FIG. 4, when placed in envelope cup 13, the closed pouch 11 closely conforms to the bottom 15 of the cup and its overlapped and bonded margins comply with and lie along the sidewalls 27 of cup 13 so that the cup readily accepts a preformed positive mass tablet or cake 28 and liquid electrolyte which fills the cup around the electrodes and separator. Typically, the liquid electrolyte can be a solution of twenty nine percent potassium hydroxide, three percent zinc oxide, and the balance deionized water. The positive mass tablet can be a pressed body of seventy-two and seven tenths percent finely divided manganese dioxide, sixteen percent of finely divided refined natured graphite, eight and three tenths percent solution of forty three and a half percent potassium hydioxide with three percent zinc oxide, and three percent of powdered Teflon, polytetraflouroethylene.

A steel collector plate 29, coated on both faces with a conductive graphite paint 30 is bonded by a layer of adhesive 31 to a cover 32 closing the cell cup 13. Electrical communication between the plate 29 and positive mass tablet 28 is enhanced by a layer of a conductive liquid 33 at the interface between those elements. One suitable material for adhesive layer 31 is a butadiene based elastomeric hot melt adhesive, designated HM8346, supplied by H B Fuller Co., Assembly Products Division, 5220 Main St. N.E., Minneapolis, Minn. 55421. The conductive paint is a dispersion of finely divided graphite in a thermoplastic resin such as polyvinyl chloride diluted with lacquer thinner, available from Acheson Colloids Company, Port Huron, Mich. 48060, as Electrodag ®109.

The cup 13 and cover 32 can be made of laminated sheet plastic as an outer layer of nylon or polypropyl and an inner layer of modified poleythylene of a suitable overall thickness, such as 7 mils for the cup and 5 mils for the cover. The cup portion 13 can be thermoformed with flanges 35 generally parallel with its bottom and adapted to be face-to-face mated with the peripherial portion 36 of cover 32 and sealed thereto as by a plurality of thermally or ultrasonically bonded seams 37.

Electrical connections are made with the internal elements of the cell by conductors which pierce the cell walls. As shown in FIG. 4, the connector 38 to the positive current collector, plate 29, is a brass wire having an L-shape with the foot 39 of the L secured to the plate in good electrical communication therewith as by soldering or welding. The body or shaft 41 of the L pierces the cover 32 and is sealed thereto against the escape of the potassium hydroxide electrolyte by the adhesive 31 and its bond to the inner face of cover 32 and the steel plate 29 having its engaged surface coated with paint 30. As disclosed in a copending patent application Ser. No. 540,022 filed herewith in the name of R. D. Simonton and entitled "Connector Aperture Seal for a Galvanic Cell and Method of its Formation", the plate 29 with connector 38 and the cover 32 with the seal and bond including paint 30 and adhesive 31 therebetween can be a subassembly of the cell disclosed. This subassembly can be applied to the cup 13 and the other assembled elements of the cell within the cup by vacuum sealing the cover 32 to the cell in a suitable vacuum chamber with seal heads raised to a temperature of about 265° to 300° F. at the point of contact with the cover 32 and flange 35.

Figure 5:
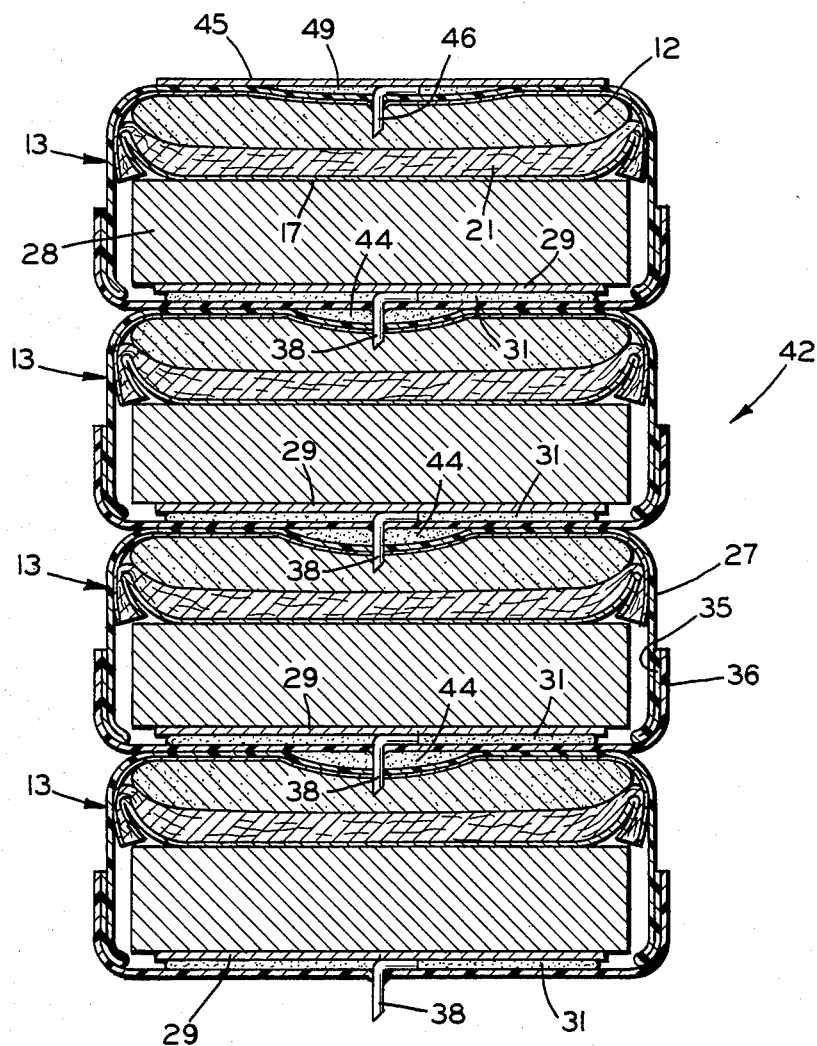
FIG. 5 is a sectioned elevational view of a battery formed of a stack of cells according to FIG. 4 arranged in series.

In a series stack of cells making up a battery 42, as shown in FIG. 5, connector 38 makes direct contact and intercell electrical communication with the negative electrode mass 12 of the next adjacent cell. Connector 38 is provided with a sharpened end 43 adapted to pierce cover 32 in the process of the assembly of collector plate 29 and cover 32 and to extend beyond cover 32 a sufficient distance to pierce the bottom 15 of the next adjacent cell envelope in the stack, pierce the bottom 14 of the electrode-separator pouch 11 subassembly and extend into the electrode mass 12 contained therein without extending through that mass to the positive mass tablet of that adjacent cell.

In order to insure against any tendency to leak the potassium hydroxide electrolyte through bottom 15 at the point connector 38 pierces it, a mass of a suitable adhesive 44 is applied around that region either on the exterior face of the cover 32 of one cell of the interconnected pair or the exterior face of the bottom 15 of the other cell. A hot melt adhesive as employed between the inner face of cover 32 and collector plate 29 can be employed as adhesive 44 in which case it is applied immediately prior to bringing the cells together and applying the stack compression to cause connector 38 to pierce bottom 15.

FIG. 4, is shown as an end cell at the negative end in a series stack of cells 42 forming a battery, or a single cell assembly wherein no adjacent cell provides a connector 38. An external negative current collector, a steel plate 45 is provided with a connector 46 corresponding to collector 38 in that it can be a brass wire of L shape having its foot 47 welded to plate 45 and its shaft end 48 sharpened to pierce envelope bottom 15 and pouch bottom 14 to enter and make electrical connection to electrode mass 12. An adhesive mass 49 seals the entry region around connector 46 and may be the hot melt defined above.

The four cell, series connected, stack forming a battery as shown in FIG. 5 is readily mounted in a casing (not shown) and connected to external terminals (not shown) by a conductor from the connector 38 of the lowermost cell to the positive terminal and a conductor from the plate 45 to the negative terminal. In the illustration the flexible cell walls containing the flexible electrode-separator components are shown as they conform to a casing with the outstanding flange 35 and cover periphery 36 portions folded along the exterior of cup sidewalls 27. The compliance of these elements enable the volume within standard battery casings to be utilized for a maximum quantity of the active elements of the several cells and thus a high capacity battery.

What is claimed is:

1. In a primary dry cell, a sealed flexible non-conductive plastic envelope, and an assembly of active cell elements within said envelope including a flexible pouch containing a fluid electrode mass, a first pouch wall including a flexible sheet of separator material which is absorbant to and retains liquid electrolyte on one side of said mass, a second pouch wall including a second flexible sheet of material which contains said mass on an opposite face of said mass from said first pouch wall, and a face-to-face bond between marginal portions of said first wall and said second wall and surrounding said fluid electrode mass.

2. A combination according to claim 1 wherein the material of said flexible sheet of separator material and said second flexible sheet each contain components which are adherently fusible to each other.

3. A combination according to claim 2 wherein said components are thermally fusible and said bond is a thermally formed bond.

4. A combination according to claim 1 including at least one of said pouch walls comprising a plurality of superimposed sheets of liquid electrolyte permeable, flexible sheet material.

5. A combination according to claim 4 wherein said one pouch wall comprises a felted sheet of fibers of a thermally fusible material, a felted sheet of fibers which is absorbant to and retains liquid electrolyte, and a thermally fused bond between said sheets.

6. A combination according to claim 4 wherein said one pouch wall comprises a first felted sheet of fibers of a thermally fusible material, a second felted sheet of fibers of a thermally fusible material, and a third felted sheet of a blend of fibers of a material which is absorbant to and retains liquid electrolyte and a thermally fusible material, and a thermally fused bond between said sheets.

7. A combination according to claim 6 wherein said thermally fusible material of each of said felted sheets of fiber is polypropylene and said mateial which is absorbant is rayon and wherein said second pouch wall is of polyethylene film.

8. A flexible electrode-separator packet adapted to be inserted in a primary cell casing during assembly of a primary cell comprising a fluid electrode mass, a first wall of said packet on one side of said electrode mass including a flexible sheet of a first material which is absorbant to and capable of retaining liquid electrolyte of the cell, a second wall of said packet of a flexible sheet material on a side of said mass opposite the one side and means bonding said first wall to said second wall in face-to-face relationship in a continuous junction enclosing said electrode mass.

9. A combination according to claim 8 wherein said first wall is of felted fiber sheet material and second wall is of film sheet material.

10. A combination according to claim 8 wherein said first wall is a composite of a plurality of sheets of felted fiber sheet material.

* * * * *